US011623726B2

(12) United States Patent
González Fernández et al.

(10) Patent No.: US 11,623,726 B2
(45) Date of Patent: Apr. 11, 2023

(54) ASSEMBLY COMPRISING AN AIRCRAFT DOOR AND AN AUXILIARY EQUIPMENT

(71) Applicant: Airbus Defence and Space S.A.U., Getafe (ES)

(72) Inventors: Ana Isabel González Fernández, Getafe (ES); Carlos Manuel Escribano Serrano, Getafe (ES); Ignacio Pereira González, Getafe (ES); Enrique García Isidoro, Getafe (ES); Daniel De Rábano García, Getafe (ES); Alicia Delgado Rosich, Getafe (ES)

(73) Assignee: Airbus Defence and Space, S.A.U., Getafe (ES)

( * ) Notice: Subject to any disclaimer, the term of this patent is extended or adjusted under 35 U.S.C. 154(b) by 433 days.

(21) Appl. No.: 16/784,748

(22) Filed: Feb. 7, 2020

(65) Prior Publication Data
US 2020/0346731 A1    Nov. 5, 2020

(30) Foreign Application Priority Data

Feb. 8, 2019    (EP) .................................... 19382091

(51) Int. Cl.
*B64C 1/14*    (2006.01)
*B25J 18/00*    (2006.01)
(Continued)

(52) U.S. Cl.
CPC ............. *B64C 1/1407* (2013.01); *B25J 18/00* (2013.01); *B64D 7/06* (2013.01); *F41A 27/06* (2013.01)

(58) Field of Classification Search
CPC ....... B64C 1/14; B64C 1/1407; B64C 1/1446; B64C 1/1461; B64C 1/36; B64D 47/00; B64D 47/08; E06B 3/94
See application file for complete search history.

(56) References Cited

U.S. PATENT DOCUMENTS

| 5,927,648 A * | 7/1999 | Woodland ................ B64D 7/00 244/129.1 |
| 8,807,482 B2 * | 8/2014 | Woodland ................ B64C 1/18 244/129.4 |

(Continued)

FOREIGN PATENT DOCUMENTS

NO    2010115876 A1    10/2010

OTHER PUBLICATIONS

National Archives Catalog, "Air crew members service the Vulcan 20mm multi-barrel cannon in the tail turret of a B-52H Stratofortress aircraft," Oct. 3, 1988, available at https://catalog.archives.gov/id/6461646 (last accessed Jul. 11, 2022). (Year: 1988).*

*Primary Examiner* — Joshua J Michener
*Assistant Examiner* — Ka Chun Leung
(74) *Attorney, Agent, or Firm* — Greer, Burns & Crain, Ltd.

(57) ABSTRACT

An assembly having an aircraft door and auxiliary equipment. The aircraft door and the auxiliary equipment are connected by a flexible deformable bellows having creases. The door comprises a passing through hole and a support joinable to the first end of the bellows. The auxiliary equipment comprises a support joinable to the second end of the bellows and a projecting part. The projecting part is configured to have elevation movement and/or azimuth movement, and the projecting part crosses the interior of the bellows and the hole of the door and protrudes out of the door. At both ends of the bellows a clamp joins and tightens each end of the bellows with the corresponding support. There is a fixed joint between the first end of the bellows and the door and a movable joint between the second end of the bellows and the auxiliary equipment.

11 Claims, 6 Drawing Sheets

(51) Int. Cl.
*F41A 27/06* (2006.01)
*B64D 7/06* (2006.01)

(56) References Cited

U.S. PATENT DOCUMENTS

| | | | |
|---|---|---|---|
| 9,151,573 B2 * | 10/2015 | Isola | F41G 3/16 |
| 9,199,717 B2 | 12/2015 | Bogiatzis | |
| 9,617,008 B2 * | 4/2017 | Goto | B64F 5/60 |
| 2008/0164373 A1 * | 7/2008 | Roming | B64C 1/14 |
| | | | 244/129.5 |
| 2014/0302243 A1 | 10/2014 | Koukal et al. | |

* cited by examiner

ASSEMBLY COMPRISING AN AIRCRAFT DOOR AND AN AUXILIARY EQUIPMENT

CROSS-REFERENCES TO RELATED APPLICATIONS

This application claims the benefit of the European patent application No. 19382091.7 filed on Feb. 8, 2019, the entire disclosures of which are incorporated herein by way of reference.

FIELD OF THE INVENTION

This invention refers to an assembly comprising an aircraft door and auxiliary equipment, suitable to be installed in the fuselage of an aircraft. The auxiliary equipment can be an automatic cannon, an articulated arm of a robot for cameras, scanners or laser, rotary mirrors for scanning mechanisms, aerial refueling boom systems, articulated hoses for extinguishing fires, retractable sensor systems, etc.

BACKGROUND OF THE INVENTION

Currently there are systems in which auxiliary equipment, such as a weapon, goes through the fuselage of an aircraft. However, these systems have a series of constraints:

Quickly achieve and maintain cabin pressurization during high altitude flights.

Be a quick and simple system without adjustments and mechanisms and unwanted parts removal that might hinder a fast deployment and quick system response while being in service.

Allow free gun movement without any transferred load.

Many aircraft with moving guns cannot fly pressurized, making them easier targets.

A solution based on doors or gates involves a high quantity of pieces, adjustments, close manufacturing tolerances, exhaustive design tasks and considerable risk of failure, besides being a very expensive option.

If small gates were to be used in order to carry out firing, some vital factors would be put at stake, such as aircraft aerodynamic and camouflage efficiency, mission effectiveness or even aircraft and crew survivability.

WO 2010115876 A1 provides a sealing assembly in an airframe of aircraft. The sealing assembly comprises a resilient and yet stiff enough bellows body which is attachable to the fuselage of the aircraft and is further attachable to a center wing box of the aircraft. The sealing assembly seals off a gap between the fuselage and the center wing box so as to allow maintaining pressure in the fuselage if the fuselage is pressurized. The bellows body is a composite and is designed to sustain exposure to wear and tear and exposure to a high and low temperatures, as well as exposure to chemicals used during operation of the aircraft. This system, however, lacks wide range movement capabilities.

US 2014302243 provides a bellows for a passage between two pivotally connected vehicles or an aircraft passenger bridge or stairway, with bellows material having a coating. The material of the bellows has a protective layer printed on, at least partially, as a coating. The bellows body connects two independent vehicle sections providing increased system mobility, but is not suitable for aeronautical structures.

Therefore, there is the need of having auxiliary equipment attached to the fuselage of an aircraft that can operate without previously opening any door, allowing recovering and maintaining cabin pressurization in case of a rapid engagement break and, at the same time, providing a wide range of operational movement.

SUMMARY OF THE INVENTION

An object of the present invention is to provide an assembly comprising an aircraft door and auxiliary equipment that overcomes the mentioned drawbacks.

The invention provides an assembly comprising an aircraft door and auxiliary equipment, the aircraft door and the auxiliary equipment being connected by a flexible deformable bellows comprising creases, wherein:

the door comprises a passing through hole and a support suitable to be joined to the first end of the bellows, the auxiliary equipment comprises a support suitable to be joined to the second end of the bellows and a projecting part, the projecting part suitable to have elevation movement and/or azimuth movement, and the projecting part crossing the interior of the bellows and the hole of the door and protruding out of the door, at both ends of the bellows there is a clamp that joins and tightens each end of the bellows with the corresponding support, such that there is a fixed joint between the first end of the bellows and the door and a movable joint between the second end of the bellows and the auxiliary equipment.

This configuration allows structural continuity and integrity while having the auxiliary equipment (for instance, a weapon) integrated onto the aircraft fuselage.

Another advantage of the invention is that it may be used to change the capabilities of an aircraft in an easy and quick way: the operator can remove the parachute doors and install the assembly comprising an aircraft door and the auxiliary equipment.

Another advantage of the invention is that it mitigates the noise in the cabin compared to the prior art systems.

Other characteristics and advantages of the present invention will be clear from the following detailed description of several embodiments illustrative of its object in relation to the attached figures.

DETAILED DESCRIPTION OF THE PREFERRED EMBODIMENTS

Figure 1:
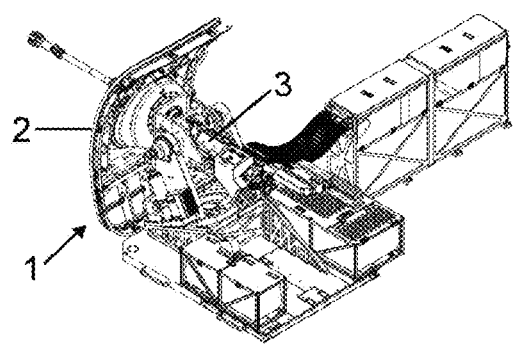
FIG. 1 shows a perspective view of an assembly of the invention comprising an aircraft door and an auxiliary equipment.
Figure 2:
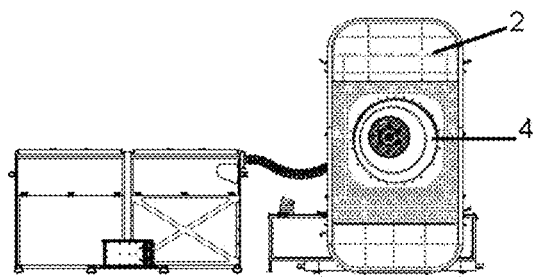
FIG. 2 shows another view of the assembly of the invention.
Figure 3:
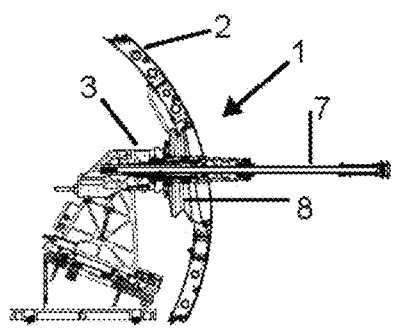
FIG. 3 shows a side view of the assembly of the invention.

FIGS. 1, 2 and 3 show several views of the assembly 1 of the invention comprising an aircraft door 2 and a piece of auxiliary equipment 3.

A flexible deformable bellows 8 that connects the aircraft door 2 and the auxiliary equipment 3 is shown in FIGS. 3 to 7. The bellows 8 has a first end 9 and a second end 10. In the embodiment of FIGS. 3 to 7, the first end 9 of the bellows 8 surrounds an opening bigger that the opening surrounded by the second end 10. The bellows 8 has several creases and it can be made of deformable and flexible materials, such as silicone and embedded fabrics, or an elastomer composite.

Figure 4:
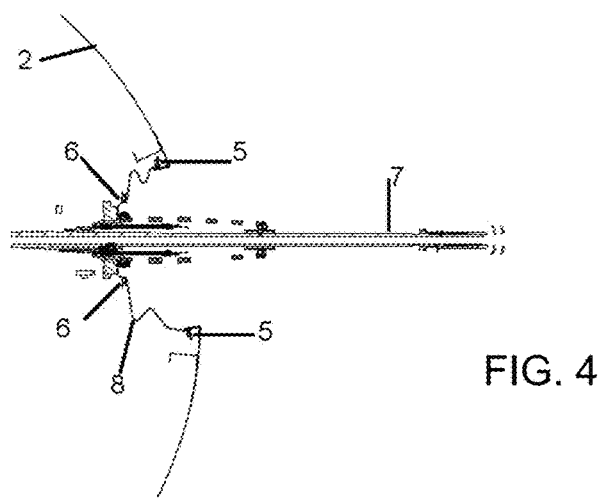
FIG. 4 shows a cross section of a part of the assembly of the invention.
Figure 5:
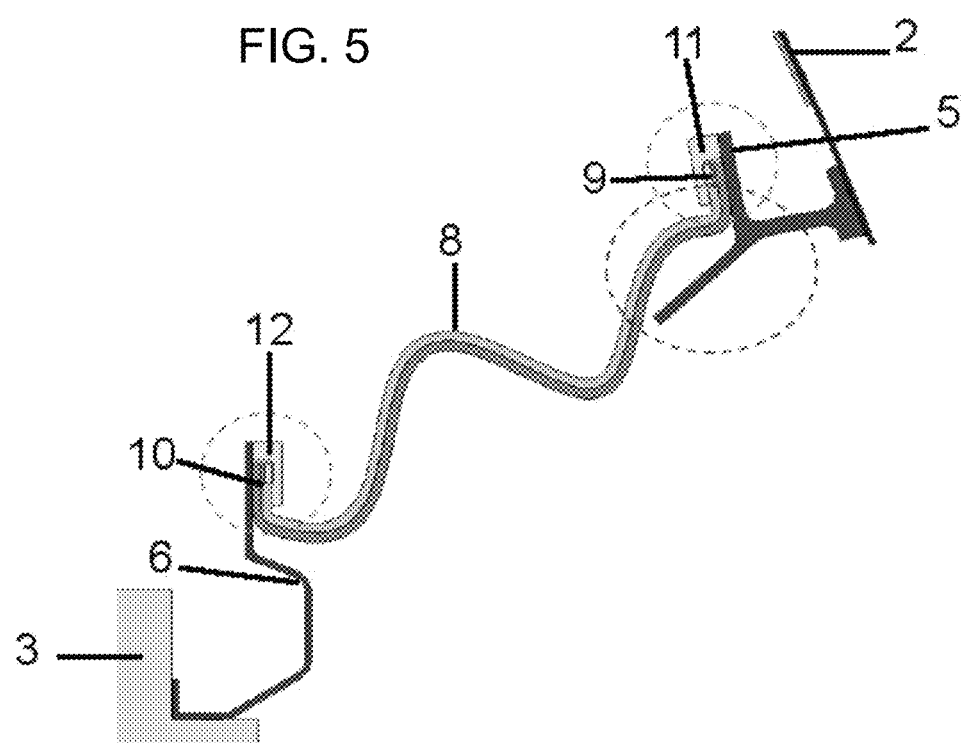
FIG. 5 shows a schematic view of some parts of the assembly of the invention.
Figure 6:
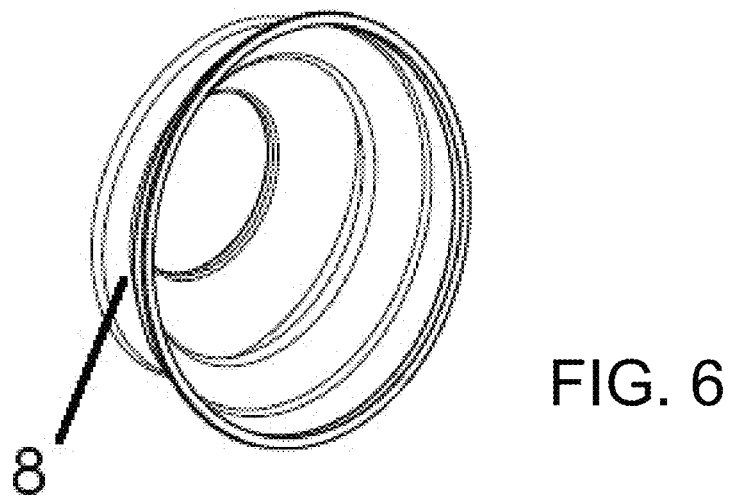
FIG. 6 shows a bellows as an element of the assembly of the invention.
Figure 7:
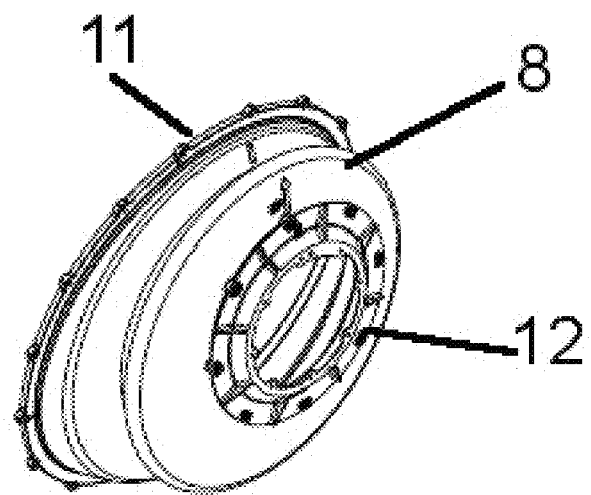
FIG. 7 shows a bellows with joints at its ends.

The aircraft door 2 comprises a passing through hole 4, which can be seen in FIG. 2, and a support 5 shown in FIGS. 4 and 5. In FIG. 5 it can be seen that the support 5 is joined to the first end 9 of the bellows 8.

The auxiliary equipment 3 comprises a support 6 and a projecting part 7. In FIG. 5 it can be seen that the support 6 is joined to the second end 10 of the bellows 8. The auxiliary equipment may comprise an automatic cannon, an articulated arm of a robot, a rotary mirror system, an aerial refueling boom system, an articulated hose, or a retractable sensor system, for example, as schematically indicated by auxiliary equipment 3 in FIG. 5.

The projecting part 7 can have an elevation movement and/or azimuth movement, and it crosses the interior of the bellows 8 and the hole 4 of the door 2 and protrudes out of the door 2 on the outer side of the aircraft, as shown in FIG. 4.

The passing through hole 4 of the door 2 can be a circular hole with a diameter of 600 mm, which allows enough space for the projecting part 7

A clamp 11 joins and tightens the first end 9 of the bellows 8 with the support 5 of the aircraft door 2. A clamp 12 joins and tightens the second end 10 of the bellows 8 with the support 6 of the auxiliary equipment 3. Attaching means (such as a system comprising a screw and an anchor unit) can be used to join the clamps 11, 12 to the corresponding supports 5, 6.

This arrangement allows a fixed joint to be located between the first end 9 of the bellows 8 and the door 2, and a movable joint located between the second end 10 of the bellows 8 and the auxiliary equipment 3.

The bellows 8 offers no resistance to any movement throughout its service life and is flexible and stiff enough to accomplish its behavior. A large cut-out through the outer surface of the fuselage (as the passing through hole 4) aids to further outperform the response of the bellows material.

The creases of the bellows 8 are designed to give the bellows 8 the desired range of movement, so that the bellows 8 will not be deformed in operation. Unwanted deformations could interfere with the installation of the projecting part 7 or even with the internal structure of the aircraft.

In this way, the installation of the auxiliary equipment 3, with a projecting part 7 protruding out of the aircraft, will not negatively affect the pressurization, the sealing, the tightness, the resistance to harsh weather conditions and the resistance to chemical exposure.

The assembly can be equipped with a recoil damper inside that contributes, along with the bellows 8, to the absorption of any kind of loads and/or vibrations, which otherwise may be transmitted onto the aircraft fuselage.

Figure 8:
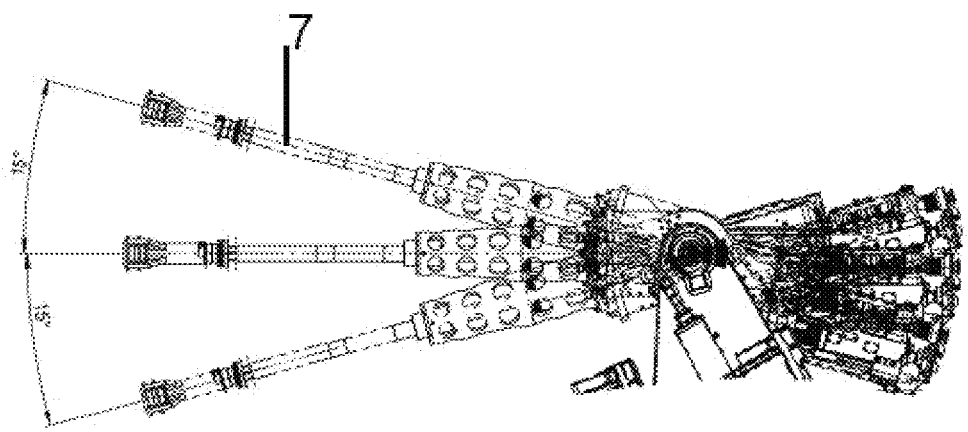
FIG. 8 shows several positions of an automatic cannon as auxiliary equipment in elevation movement.
Figure 9:
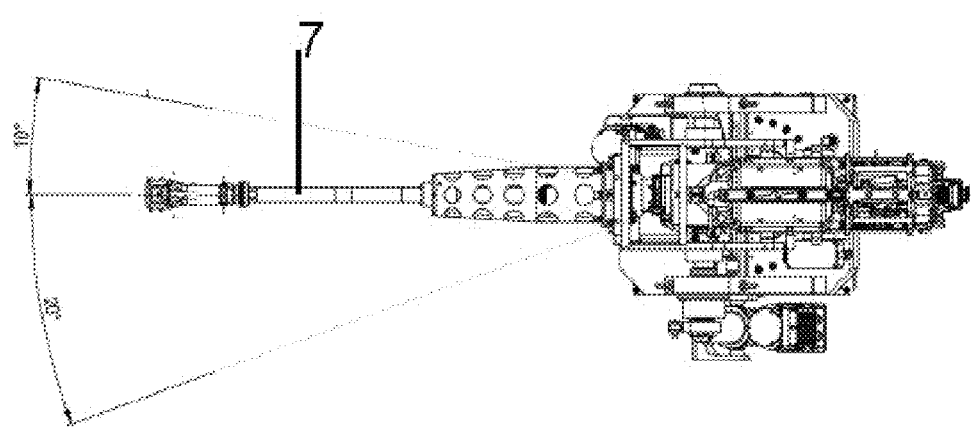
FIG. 9 shows several positions of an automatic cannon as the auxiliary equipment in azimuth movement.
Figure 10:
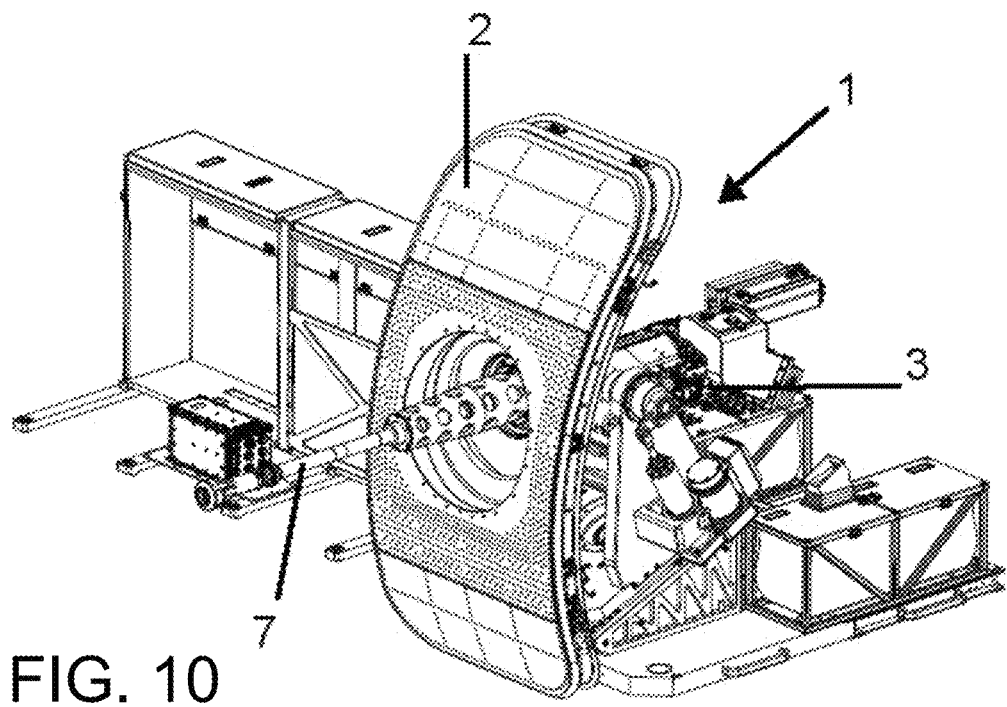
FIG. 10 shows a perspective view of an assembly of the invention comprising an aircraft door and an automatic cannon as the auxiliary equipment.
Figure 11:
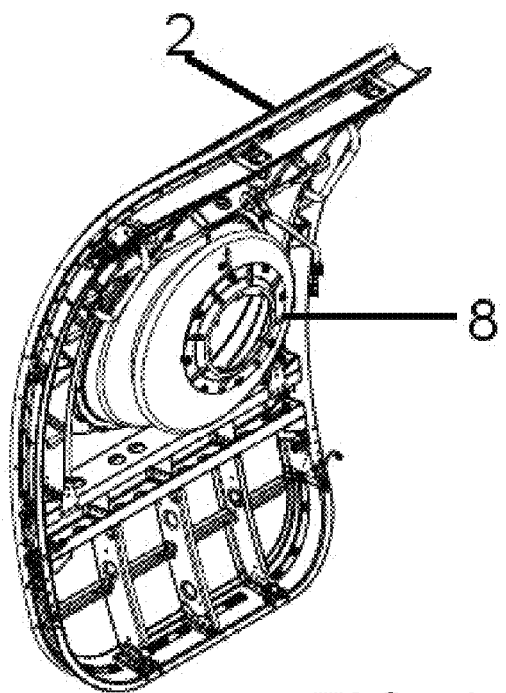
FIG. 11 shows an aircraft door with a bellows.

FIGS. 8 and 9 show the movement range of the auxiliary equipment, which is an automatic cannon in these figures. The projecting part 7 of the automatic cannon has an elevation movement range between −15° and +15° and an azimuth movement range between −20° and +10°.

Apart from a weapon (such an automatic cannon), it is to be taken into account that the invention can be applied to a large variety of equipment that need to have a part extending out of the aircraft for different purposes, getting controlled and precise movements, while ensuing pressurization inside the aircraft. This equipment can be, for example:

an articulated arm of a robot for cameras, scanners or laser,
rotary mirrors for scanning mechanisms,
aerial refueling boom systems,
articulated hoses for extinguishing fires,
retractable sensor systems.

Figure 13:
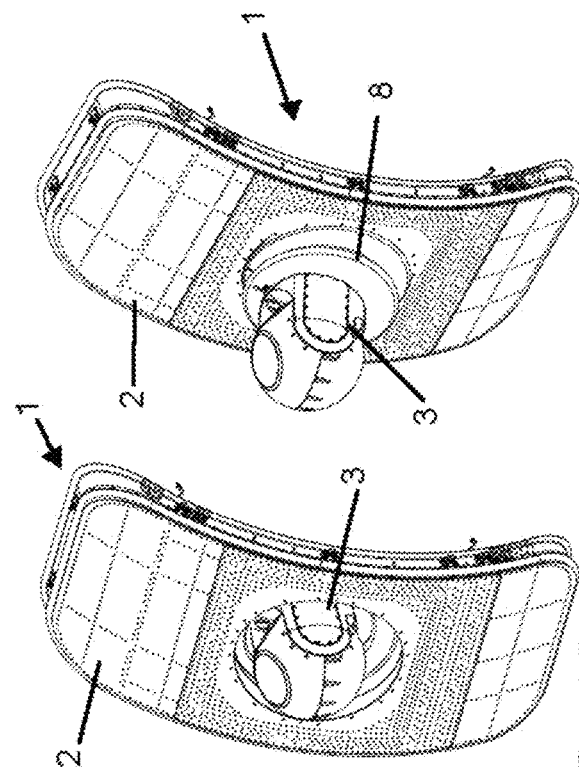
FIGS. 12 to 14 shows another embodiment of the assembly of the invention.
Figure 12:
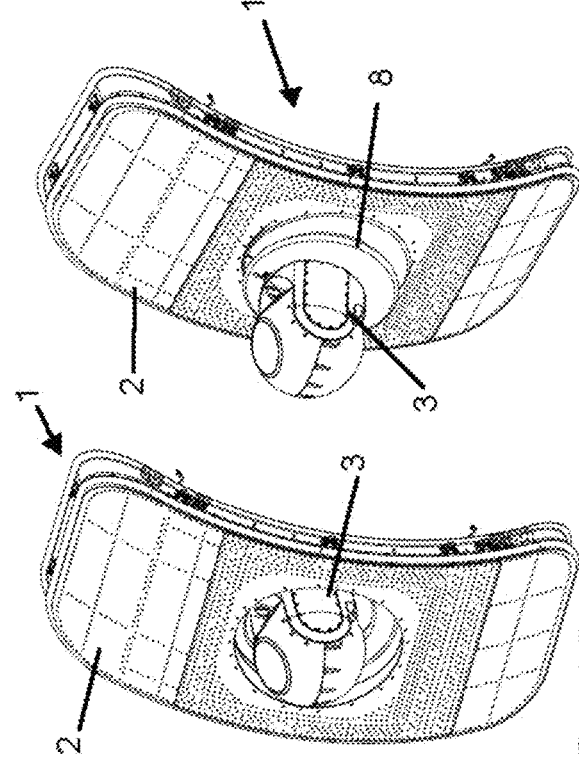
Figure 14:
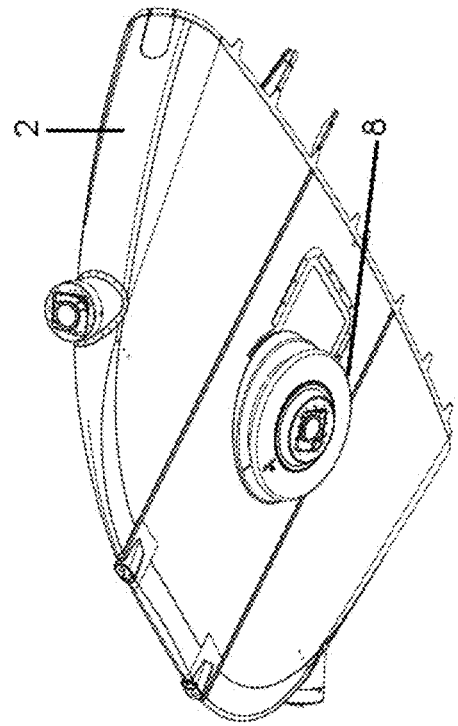

FIGS. 12 to 14 show another embodiment of the assembly 1 of the invention comprising an aircraft door 2 and auxiliary equipment 3. In this case the auxiliary equipment is a retractable sensor. FIG. 12 shows the assembly 1 with the sensor in a retracted position and FIG. 13 shows the sensor in an extended position. FIG. 14 shows the inside of the aircraft door 2 with the bellows 8.

Figure 15:
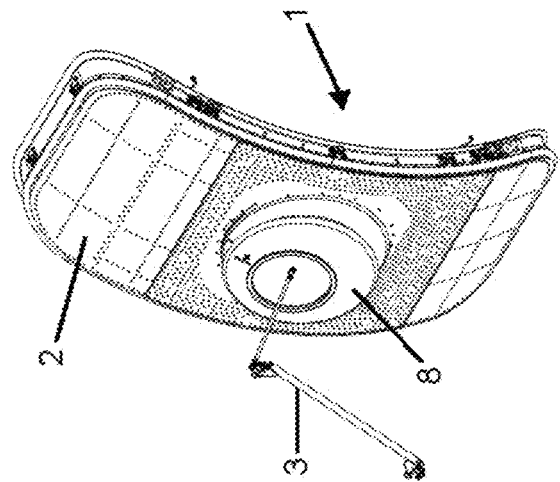
FIG. 15 shows another embodiment of the assembly of the invention.

FIG. 15 shows another embodiment of the assembly 1, also comprising an aircraft door 2 and auxiliary equipment 3. In this case the auxiliary equipment is an articulated system with arms.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising:
an aircraft door, and
an auxiliary equipment,
the aircraft door and the auxiliary equipment being connected by a flexible deformable bellows comprising creases,
the aircraft door comprising a passing through hole and a support suitable to be joined to a first end of the flexible deformable bellows,
the auxiliary equipment comprising a support suitable to be joined to a second end of the flexible deformable bellows and a projecting part, the projecting part configured to have at least one of elevation movement or azimuth movement, and the projecting part crossing an interior of the flexible deformable bellows and the passing through hole of the aircraft door and protruding out of the aircraft door, and at both ends of the bellows there is a clamp that joins and tightens each end of the flexible deformable bellows with the corresponding support, wherein, there is a fixed joint between the first end of the bellows and the aircraft door and a movable joint between the second end of the flexible deformable bellows and the auxiliary equipment, wherein the first end of the flexible deformable bellows is positioned between the projecting part and the second end of the flexible deformable bellows.

2. The assembly according claim 1, wherein the auxiliary equipment is an automatic cannon.

3. The assembly according to claim 2, wherein the projecting part of the automatic cannon has an elevation movement between −15° and +15° and an azimuth movement between −20° and +10°.

4. The assembly according to claim 1, wherein the flexible deformable bellows is made of silicone and embedded fabrics or of an elastomer composite.

5. The assembly according to claim 1, wherein the passing through hole of the aircraft door has a diameter of at least 600 mm.

6. The assembly according to claim 1, wherein the auxiliary equipment is an articulated arm of a robot.

7. The assembly according to claim 1, wherein the auxiliary equipment is a rotary mirror system.

8. The assembly according to claim 1, wherein the auxiliary equipment is an aerial refueling boom system.

9. The assembly according to claim 1, wherein the auxiliary equipment is an articulated hose.

10. The assembly according to claim 1, wherein the auxiliary equipment is a retractable sensor system.

11. An assembly comprising:

an aircraft door, and an auxiliary equipment, the aircraft door and the auxiliary equipment being connected by a flexible deformable bellows comprising creases, the aircraft door comprising a passing through hole and a support suitable to be joined to a first end of the flexible deformable bellows, the auxiliary equipment comprising a support suitable to be joined to a second end of the flexible deformable bellows and a projecting part, the projecting part configured to have at least one of elevation movement or azimuth movement, and the projecting part crossing an interior of the flexible deformable bellows and the passing through hole of the aircraft door and protruding out of the aircraft door, and at both ends of the bellows there is a clamp that joins and tightens each end of the flexible deformable bellows with the corresponding support, wherein, there is a fixed joint between the first end of the bellows and the aircraft door and a movable joint between the second end of the flexible deformable bellows and the auxiliary equipment, wherein the auxiliary equipment is a retractable sensor system.

* * * * *